UNITED STATES PATENT OFFICE 2,557,299

UREA-FORMALDEHYDE PAPER-TREATING COMPOSITIONS

James C. Lehr, Denis J. O'Flynn, and Reade Y. Tompson, Wilmington, Del., assignors to E. I. du Pont de Nemours & Company, Wilmington, Del., a corporation of Delaware No Drawing. Application March 9, 1950, Serial No. 148,757

14 Claims. (Cl. 260—29.4)

This invention relates to improvements in the manufacture of compositions which are useful in making high wet-strength paper. More particularly, the invention is directed to a process for the preparation of a modified urea-formaldehyde paper-treating composition. Moreover, the invention also relates to the process of making paper wherein the said improved composition is employed as an additive in the beater stage, or applied to the paper web by spraying or otherwise in a later stage in the paper making process.

Heretofore numerous methods have been proposed for imparting wet-strength to paper. For example, it was known heretofore that urea-formaldehyde condensation products are effective in imparting wet-strength to paper, especially when applied in a tub-sizing process. This method is inherently unattractive mainly because it requires the evaporation of large amounts of water after application. Various urea-formaldehyde compositions, which usually contain third resin-forming components to increase the rate of resin pickup have been made available commercially and are used in beater or head box applications. Melamine-formaldehyde resins also have been added to paper in the beater stage for the purpose of imparting high wet-strength. In general, paper which has been treated with any of the aforesaid reagents is subsequently dried and heated in order to cure the resin ingredients thus causing the cellulose fibers which make up the paper web to become bonded firmly together, whereby the wet-strength of the paper is materially improved.

In order to increase the affinity of urea-formaldehyde condensation products for cellulose, and to impart wet-strength to the paper more efficiently, numerous modifiers for the urea-formaldehyde condensation products have been employed. For example, glycine and protein materials, such as gelatin, have been used for this purpose. Other modifying agents which have been employed in a similar manner include the bisulfites of inorganic and organic bases. In general, the best of the previously known modified urea-formaldehyde condensation products, when employed in sufficient quantity to give treated paper containing about 0.5 to 2% of resin, produce paper in which the wet-strength amounts to only about 25% to 30% of the dry strength of the untreated paper. Melamine-formaldehyde is much more effective, and paper impregnated with 0.5 to 2% of melamine-formaldehyde has wet-strengths amounting to about 50% to 65% of the dry-strengths of the untreated paper.

An object of this invention is to provide further improvements in the manufacture of modified urea-formaldehyde condensation products which are of value as agents for imparting wet-strength to paper. Another object is to provide a relatively stable modified urea-formaldehyde composition which is effective as an agent for improving wet-strength when employed in spray application, tub-sizing, or beater application. Other objects of the invention will appear hereinafter.

It has been discovered in accordance with this invention that high wet-strength paper can be formed from paper materials by treatment with urea-formaldehyde condensation products which have been modified with certain polyfunctional compounds (diglycolic anhydride, cyanuric acid, adipic acid, ethylene-bisiminodiacetic acid, diglycolic acid, oxalic acid, etc.), notably diglycolic acid and alkali metal salts thereof. It has also been discovered in accordance with this invention that a modified urea-formaldehyde composition having exceptionally high affinity for cellulose can be prepared by condensing urea with formaldehyde and with 2 to 20 (preferably 4 to 8) parts by weight of diglycolic acid per 100 parts of combined urea and combined formaldehyde. If desired a preformed methylol urea may be employed in place of the said urea-formaldehyde mixture. The ratio of combined formaldehyde to combined urea in the final resin should be within the range of about 1.5:1 to 2.5:1 (mol proportions).

Any unpolymerized urea-formaldehyde composition having the appropriate mol ratio of combined formaldehyde to combined urea may be employed in the practice of this invention. Urea-formaldehyde compositions which are obtained by admixing urea with formalin give rather satisfactory results. Similar results are obtained using dimethylol urea solutions. The preferred urea-formaldehyde compositions are those which are obtained by the process described in the Kvalnes Patent Re. 23,174 (reissue date November 29, 1949). In the latter process a mixture of gaseous formaldehyde and water vapor, suitably the mixture which is obtained by oxidation of methanol, is cooled from a temperature above 90° to a temperature within the range of 60° to 90° whereby a mixture having from 50% to 70% by weight of formaldehyde is obtained; the temperature of this liquid mixture is maintained continuously at 60° to 90° C. until the said liquid is brought into contact with urea. The addition of urea is carried out in the presence of a buffer which maintains the pH within the range of 7.0 to 9.0, and the amount of urea which is added is controlled so that the urea-formaldehyde product contains from 4.5 to 7 mols of formaldehyde per mol of urea. After addition of the urea, the mixture is at least momentarily heated at from 70° to 90° C. whereby a product which remains a clear liquid when cooled to 25° C. is obtained. This clear liquid is remarkably stable and does not become cloudy even when stored for prolonged periods of time. In practicing the present invention it is desirable to add urea to this clear liquid in order to adjust the formaldehyde:urea ratio to a value within the range of 1.5:1 to 2.5:1. The resulting mixture may thereafter be modified with diglycolic acid or alkali metal diglycolate as disclosed herein.

It is to be understood, of course, that the diglycolic acid need not be introduced as such, but may be added in the form of diglycolic anhydride, diglycolamide, or a diglycolate salt or ester; it may be added in the form of any derivative which will produce diglycolic acid in situ when the reaction mixture is acidic.

The modified urea-formaldehyde may be applied to the cellulose fibers by any suitable methods, i. e. the paper material may be wet with the treating agent by spraying, dipping, soaking, etc.

The invention is illustrated further by means of the following examples.

*Example 1.*—A liquid urea-formaldehyde composition was prepared by cooling gaseous formaldehyde and water vapor having initially a temperature above 90° C. to a temperature of about 60° C., the weight of formaldehyde being about 60% of the weight of the resultant aqueous liquid, and thereafter admixing the said liquid with urea at a temperature of about 60° C. in the presence of a buffer which maintained a pH within the range of 7.0 to 9.0 (i. e. NaOH was added in sufficient quantity to produce this pH), until the mol ratio of free and combined formaldehyde to free and combined ureas was about 5:1. The resulting clear liquid having a pH of about 7 remained stable when stored at room temperature. To 200 grams of this clear aqueous solution was added a sufficient quantity of dilute aqueous sodium hydroxide to produce a pH of 8.2. Urea (47.6 grams) was added to this mixture in a reaction vessel equipped with a stirrer and reflux condenser. The resulting mixture was heated from a temperature of 28° C. to a maximum of 93° C., and the temperature was maintained at 90° to 93° C. for about twelve minutes. Three milliliters of hydrochloric acid (0.5 N) were then added, and the resulting mixture was stirred until the viscosity reached 300 centipoises (Gardner-Holt scale). The pH of the mixture at this stage was 5.25. Dilute sodium hydroxide was added to this mixture with stirring until the pH reached 8.1, the temperature during these operations being maintained at about 90° to 100° C. After two months' storage at room temperature the viscosity of the mixture had increased only very slightly, and no gelation had occurred. To 50 grams of the solution of urea-formaldehyde condensation product prepared as above described was added 3.5 grams of diglycolic acid with stirring at 30° C. Dilute aqueous sodium hydroxide was also introduced, so that the resulting mixture had a pH of 8.0 to 8.5. This mixture was heated at a temperature of about 80° to 90° C. for 15 minutes. The solution thus obtained remained clear when cooled to 28° C. A dilute, clear solution or dispersion of the diglycolic acid modified urea-formaldehyde condensation product was prepared by admixing 4.1 grams of the above-described diglycolic acid modified urea-formaldehyde solution with 95.9 grams of water. The pH of the solution or dispersion thus obtained was adjusted to 3.5 by means of dilute hydrochloric acid. Sheets of machine-made, unbleached, unsized, untreated kraft paper, 7 inches by 7 inches in size, each weighing about 1.8 grams, were conditioned by storing at 25° C., 50% relative humidity, for 24 hours (A. S. T. M. D685–44). The sheets were then weighed. The sheets were then sprayed uniformly on each side with the diglycolic acid modified urea-formaldehyde condensation product using a spray gun. The sprayed papers were then squeezed between rubber rolls and dried on a drum dryer at a temperature of about 250° F. for about 0.5 to 1.0 minute. The impregnated sheets were cured in an oven containing circulating air at a temperature of 248° F. for 30 minutes. After this the sheets were reconditioned at a temperature of 25° C., 50% relative humidity, for 24 hours and were reweighed. The resin content of the paper as determined by the weight increase was 0.5 to 0.6% based on the total weight of the untreated sheet. The dry burst strength of the treated sheet (Mullen test, A. S. T. M. D774–46) was 29 to 33 lbs. per sq. inch; the corresponding dry burst strength of the same sheet material without treatment was about 31 lbs. per sq. inch. Wet-strength of untreated sheets after 20 minutes soak was about zero. Samples of the treated sheets were soaked in water for 15 seconds and 20 minutes respectively. The burst strengths of these wet sheets were then determined and shown in each instance to be from 50% to 60% of the corresponding dry burst strengths of the untreated sheets. The entire procedure was repeated in substantially the same manner as above-described except that the urea-formaldehyde condensation product which was employed as the impregnating agent was not modified with diglycolic acid. The resin content of the kraft sheet thus obtained was 0.69% and the wet burst strength, determined in the same manner as above described, was only 23% of the dry burst strength of the control.

*Example 2.*—Samples of diglycolic acid modified urea-formaldehyde treated paper were prepared in the same manner as in Example 1 except that the rubber rolls were operated in such a manner that the resin content of the dried impregnated sheet was about 2.95 to 3.5% based on the weight of the untreated paper. Wet burst strengths were determined on the sheets thus obtained after soaking times of 20 minutes, 24 hours, and 140 hours respectively. In each instance the wet burst strength was within the range of 65% to 70% of the dry burst strength of the untreated paper.

The entire experiment was repeated using paper impregnated with 2.5% and 2.7% of the diglycolic acid modified urea-formaldehyde resin respectively. The wet burst strength of the paper containing 2.5% resin was 71% of the dry burst strength in a 20 minutes soaking test and 61.5% in an 8-day soaking test. The wet burst strength of the paper containing 2.7% resin was 60% of the dry burst strength in a 20 minutes soaking test and 55% of the dry burst strength in an 8.5 days soaking test.

*Example 3.*—A urea-formaldehyde condensation product having an F/U ratio of 5 was prepared as described in Example 1. To 100 grams of this product was added 28 grams of urea and 60 ml. of water, whereby a solution was obtained in which the F/U ratio was 2. The resulting mixture had a pH of 7.5. To this, with stirring, was added a solution of 10.5 grams of diglycolic acid and 20 ml. of water, and a 25% (by weight) aqueous solution of sodium hydroxide was also added, the relative rates of addition being such that the pH did not drop below 4. A little more of the sodium hydroxide solution was thereafter added to bring the pH to 8.65. The solids content of this mixture (which contained about 100 grams of urea-formaldehyde) was 45%. In the tests described below this material is referred to as solution A.

For comparison purposes a solution was prepared by mixing 100 grams of the aqueous urea-formaldehyde condensation product having an F/U ratio of 5 (as above-described), with 28 grams of urea and 60 grams of water. This gave a solution having a solids content of 50%, hereinafter called solution B.

A third solution was prepared for comparison purposes. This was a paper-treating urea-formaldehyde composition prepared according to conventional methods (cf. U. S. 2,325,302) by admixing 85 grams of 35.5% (by weight) aqueous formaldehyde with 30 grams of urea, and adjusting the pH to 7.5. This mixture is referred to below as solution C.

A fourth solution was prepared by mixing diglycolic acid with solution C in the same manner, and in the same weight proportions, as had been employed in making the diglycolic acid modified product hereinabove referred to as solution A, with the exception that 8.0 grams of diglycolic acid were used and the 60 grams water were omitted. This fourth solution was designated as solution D.

A fifth solution was made by adding 10% by weight of melamine on a solids basis to solution B. The resulting mixture was designated as solution E.

A sixth solution was made by adding 10% by weight of melamine on a solids basis to solution C. The resulting mixture was designated as solution F.

A seventh solution was made as follows: 50 grams of unmodified urea-formaldehyde composition was prepared as described in Example 1 except that the viscosity was permitted to reach 120 cps. (solids 73% by weight) before addition of the alkali. To the mixture was added 1.87 grams of melamine (instead of the diglycolic acid used in Example 1). This solution was heated at 85° to 90° C. for five minutes until a viscosity of 300 cps. was attained. The pH was 8.2. The solution thus obtained was designated solution G.

An eighth solution was prepared as described above with respect to solution G except that the weight of melamine added was 1.69 grams and the heating was continued at 90° for five minutes; the viscosity of the final solution was 550 cps. This was designated as solution H.

To 50 grams of urea-formaldehyde composition (73% solids) prepared as described in Example 1 but having a viscosity of 1290 centipoises was added 1.87 grams of melamine. The temperature was maintained at 90° C. for five minutes. The resulting solution was designated as solution I.

The above-described solutions were employed in comparative tests to determine their effectiveness as reagents for increasing the wet-strength of paper. The tests were performed as set forth in Example 1. The results are recorded in the table given below. In each instance the solution was diluted to about 3% solids, and the pH was adjusted by the addition of dilute hydrochloric acid immediately before being applied to the sheets. There was in each instance (except as otherwise indicated) a four-hour interval between time of preparation and acidification of the dispersion to be sprayed. The figures given in the following table are the values for the wet burst strengths, expressed as percentages of the dry burst strengths of the untreated paper.

Wet burst strengths of unsized, unbleached kraft paper treated with modified urea-formaldehyde compositions

| Paper-Treating Solution | | | Per Cent Resin in Paper | Wet Burst Strengths at Various Soaking Times (Per Cent of Dry Burst Strength of the Untreated Paper) | | | | |
|---|---|---|---|---|---|---|---|---|
| Designation | pH | Extent of Polymerization | | 20 min. | 24 hrs. | 60 hrs. | 71 hrs. | 118 hrs. |
| C | 4.5 | | 0.11 | 9.7 | 0 | | | |
| C | 4.5 | | 0.28 | 9.7 | 0 | | | |
| C | 4.5 | | 1.57 | 13.0 | 9.65 | | | |
| C | 4.5 | | 2.25 | 26.0 | 14.5 | | | |
| C | 4.5 | | 0.5 | 25.0 | | | 8.0 | |
| C | 4.5 | | 1.13 | 16.8 | | | 8.0 | |
| C | 4.5 | | 1.15 | 19.4 | | | 9.7 | |
| C | 4.5 | | 2.7 | 37.0 | | | 32.0 | |
| C | 4.5 | | 2.65 | 38.5 | | | 29.0 | |
| C | 4.5 | | 3.2 | 42.0 | | | 29.0 | |
| C | 4.5 | | 19.7 | 45.0 | 38.0 | | | |
| C | 4.5 | | 24.0 | 36.65 | 31.5 | | | |
| B | 4.5 | | 0.82 | 9.7 | 6.5 | | | |
| B | 4.5 | | 1.54 | 9.7 | 11.3 | | | |
| B | 4.5 | | 2.3 | 19.4 | 16.2 | | | |
| B | 4.5 | | 2.5 | 19.4 | 14.5 | | | |
| B | 4.5 | | 19.5 | 45.00 | 22.5 | | | |
| B | 4.5 | | 22.0 | 45.00 | 32.0 | | | |
| B | 4.5 | | 1.1 | 16.00 | 11.3 | | | |
| B | 4.5 | | 1.1 | 15.2 | 11.3 | | | |
| B | 4.5 | | 2.2 | 17.8 | 14.5 | | | |
| B | 4.5 | | 2.8 | 65.0 | 38.5 | | | |
| B | 4.5 | | 3.35 | 60.0 | 32.0 | | | |
| B | 4.5 | | 5.0 | 59.0 | 42.0 | | | |
| D | 4.5 | | 1.06 | 29.0 | | | | 17.7 |
| D | 4.5 | | 1.54 | 32.0 | | | | 19.3 |
| D | 4.5 | | 1.79 | 43.5 | | | | 29.0 |
| A | 4.5 | | 1.25 | 48.5 | | | | 25.8 |

*Wet burst strengths of unsized, unbleached kraft paper treated with modified urea-formaldehyde compositions*—Continued

| Paper-Treating Solution | | | Per Cent Resin in Paper | Wet Burst Strengths at Various Soaking Times (Per Cent of Dry Burst Strength of the Untreated Paper) | | | | |
|---|---|---|---|---|---|---|---|---|
| Designation | pH | Extent of Polymerization | | 20 min. | 24 hrs. | 60 hrs. | 71 hrs. | 118 hrs. |
| A | 4.5 | | 1.42 | 45.0 | | | | 29.0 |
| A | 4.5 | | 1.48 | 53.0 | | | | 21.0 |
| D | 4.5 | | 1.0 | 35.5 | | | | 27.4 |
| D | 4.5 | (Sixteen hours between preparation and application) | 1.54 | 42.0 | | | | 34.0 |
| D | 4.5 | | 1.62 | 48.0 | | | | 42.0 |
| D | 4.5 | | 1.28 | 50.0 | | | | 32.2 |
| A | 4.5 | | 1.37 | 53.0 | | | | 35.6 |
| A | 4.5 | | 1.77 | 55.0 | | | | 37.2 |
| A | 4.5 | | 1.17 | 52.0 | | | | 30.6 |
| D | 3.5 | | 1.41 | 53.0 | | | | 32.0 |
| D | 3.5 | | 1.5 | 55.0 | | | | 42.0 |
| D | 3.5 | | 1.65 | 53.0 | | | | 34.0 |
| D | 3.5 | | 1.1 | 56.5 | | | | 42.0 |
| A | 3.5 | | 1.2 | 61.5 | | | | 43.5 |
| A | 3.5 | | 1.25 | 61.5 | | | | 42.0 |
| A | 3.5 | | 1.25 | 65.0 | | | | 43.5 |
| A | 3.5 | | 1.45 | 68.0 | | | | 45.0 |
| A | 3.5 | | 1.27 | 55.0 | | | | 40.5 |
| D | 3.5 | (Sixteen hours between preparation and application) | 1.47 | 65.0 | | | | 42.0 |
| D | 3.5 | | 1.47 | 65.0 | | | | 47.00 |
| D | 3.5 | | 1.5 | 65.0 | | | | 42.00 |
| A | 3.5 | | 1.5 | 66.0 | | | | 48.0 |
| G | 5.5 | 300 cps | 3.26 | 34.0 | | | | |
| H | 5.5 | 300 cps | 3.35 | 45.0 | | | | |
| H | 5.5 | 550 cps | 2.57 | 42.0 | | | | |
| H | 5.5 | 550 cps | 3.26 | 38.5 | | | | |
| I | 5.5 | 4,600 cps | 0.37 | 8.2 | | | | |
| I | 5.5 | 4,600 cps | 0.43 | 6.5 | | | | |
| I | 5.5 | 4,600 cps | 2.5 | 32.0 | | | | |
| I | 5.5 | 4,600 cps | 2.65 | 29.0 | | | | |
| G | 5.5 | 300 cps | 2.65 | 28.0 | | | | |
| G | 5.5 | 300 cps | 2.8 | 32.0 | | | | |
| F | 4.5 | | 0.72 | 11.2 | | 6.5 | | |
| F | 4.5 | | 0.92 | 14.5 | | 6.5 | | |
| F | 4.5 | | 1.65 | 19.3 | | 6.5 | | |
| E | 4.5 | | 0.48 | 21.0 | | 22.5 | | |
| E | 4.5 | | 0.60 | 21.0 | | 14.5 | | |
| E | 4.5 | | 0.92 | 27.5 | | 19.3 | | |
| F | 4.5 | | 0.86 | 17.7 | | 9.7 | | |
| F | 3.5 | | 0.91 | 21.0 | | 11.6 | | |
| F | 3.5 | | 1.00 | 19.3 | | 12.8 | | |
| E | 3.5 | | 0.73 | 22.5 | | 21.0 | | |
| E | 3.5 | | 0.82 | 29.0 | | 19.3 | | |
| E | 3.5 | | 0.92 | 40.0 | | 24.2 | | |

*Example 4.*—A urea-formaldehyde condensation product having an F/U ratio of 5 was prepared as described in Example 1. To 100 grams of this product was added 23.8 grams of urea, whereby a solution was obtained in which the F/U ratio was 2.25/1 (pH=8.4). This was heated to a temperature of 103° C. for 7 minutes. To the resulting mixture with stirring was added 10 milliliters of 0.5% aqueous HCl at 98° after which the mixture was heated to 100° C. for 6 minutes. To it was added at 100° C. 2 milliliters of 5% aqueous sodium hydroxide solution. After cooling to 28° C. a clear solution having a pH of 9.5 and a viscosity of 320 cps. (solids content 66%) was obtained. To 50 grams of this material was added 5.52 grams of relatively dry disodium diglycolate (89% disodium diglycolate+11% water) with stirring at 28° C. (time required for addition=5 minutes) which caused the pH to drop to 8.6. The resulting mixture was heated at 80° C. for 5 minutes. One milliliter of 0.5 N hydrochloric acid was added and the temperature was brought to 93° C. The pH at this stage was 7.45. Heating at a maximum of 93° C. was continued for 27 minutes. Upon cooling to room temperature a clear solution (i. e., dispersion) having a viscosity of 250 cps. (pH 7.45, solids content 69%) was obtained. This mixture was stable upon prolonged storage. To obtain a solution for spray treatment of paper this resin solution was diluted to 3% solids by addition of water. The dilution caused the dispersion to become cloudy (pH, 7.2). The pH of the cloudy mixture was adjusted to 3.5 by addition of 0.5 N hydrochloric acid, and the resulting dispersion was sprayed on unbleached unsized kraft paper as described in Example 1. The resin content of the paper thus treated was 2.3%; the wet burst strength of the treated paper was 61% of the dry burst strength of the untreated paper. At 2.5% resin, the wet burst strength was 65% of the dry burst strength of the untreated paper; at 2.58% resin, 55%; at 3.0% resin, 51.5 (all 20 minutes soaking before measurement of the strength). Wet burst strengths above reported were measured as described in Example 1. In another series of experiments the effect of the disodium diglycolate-modified urea-formaldehyde in beater application was determined. Unbleached kraft pulp of Canadian freeness 500 was weighted out in sufficient quantity (12.3 grams) to give 2.5 grams of paper pulp. To the kraft pulp was added approximately 110 grams of water, and the mixture was agitated with a stainless steel stirrer. A sufficient quantity of the 3.0% dispersion (pH, 7.2) was added to obtain 1% resin in the slurry based on the weight of dry pulp. Six milliliters of 5% aqueous alum (iron free) was added as the beating continued. The pH of the slurry after 10 minutes heating was 4.1. The pulp was transferred to a sheet mold and a sheet was formed and drum-dried at 240° F. after which it was cured at 250° F. for 0.5 hour. The sheet stood for 2 hours before testing. Dry burst strength of the treated paper was somewhat improved over the dry burst strength of corresponding untreated paper. The wet burst strength (after 20 minutes soaking) was about 25 to 30% (in three tests the actual percentages were 24%, 27.5% and 30%) of the dry burst strength of the untreated paper. In the same way, disodium diglycolate-UF treated paper was prepared using 3% resin in the beater (based on the weight of dry pulp). Again the dry burst strength was somewhat improved over the dry burst strength of the untreated paper. The wet burst strength was about 60% (actual percentages: 55, 60, 62.5%) of the dry burst strength of the untreated paper. These wet burst strengths are virtually the same as the wet burst strengths of paper similarly treated with melamine-formaldehyde resin.

It is to be understood that the foregoing examples are illustrative only and that other embodiments of the invention will occur to those who are skilled in the art. For example, monosodium diglycolate could be employed in place of diglycolic acid or the disodium salt thereof. Salts of diglycolic acid other than the alkali metal salts may be present if desired, e. g. ammonium diglycolates. The temperature at which the unpolymerized urea-formaldehyde condensation product may be reacted with the diglycolic acid or alkali metal diglycolate can be varied, but is preferably within the range of 25° to 100° C. An aqueous alkaline medium may be used in carrying out this reaction, as illustrated in Example 4.

The invention is not directed solely to the paper treatment step, but is also directed to improvements in compositions which are useful in making high wet strength paper; for instance, in Example 4 a composition is disclosed which has a solids content of 69% (pH=7.45, viscosity=250 cps.) and which is clear and stable. This particular composition is exceptionally valuable and useful, because in the paper treating art it is customary for paper manufacturers to purchase paper-treating compositions from chemical manufacturers; this particular composition is suitable for shipment to paper manufacturers, and possesses a combination of outstanding properties, i. e. stability, clarity, and high wet strength-imparting quality. Moreover, in the manufacture of this particular composition, the urea formaldehyde is not acidified, i. e. made acidic, at any stage in the process; this is advantageous from the standpoint of corrosion, avoidance of contamination, etc. Treatment of cellulosic paper material (i. e. pulp, sheet, etc.) with this particular composition can be accomplished by any of the suitable impregnating methods which are known in the paper manufacturing art.

From the foregoing examples it is apparent that results which have been obtained by employing diglycolic acid or alkali metal diglycolate modified urea-formaldehyde (Example 3, solutions A and D, Example 4, etc.) are far superior to the prior art results employing unmodified urea-formaldehyde. The improvement is especially noteworthy in the tests in which the resin content of the paper does not exceed 2%. When the percentage of diglycolic acid-modified urea-formaldehyde resin in the paper was as high as about 4% or higher, excellent wet-strengths were also obtained. The data given in the table in Example 3 show that when a specific kind of unmodified urea-formaldehyde, namely solution B (which has been disclosed recently in the Kvalnes patent Re. 23,174), is employed products having excellent wet-strengths are obtained especially if the percentage of resin in the paper is high (2.8% to 5%).

It is to be understood that mixtures of the various modifiers hereindisclosed may be employed if desired.

The minimum quantity of diglycolic acid or alkali metal diglycolate modified urea-formaldehyde which produces a beneficial effect is extremely small, but in most instances it is desirable to employ at least about 0.1% of the resin, based on the weight of the dry untreated paper, because, at lower resin contents, uneven distribution of the resin may produce weaknesses in local areas, and as a result relatively poor results may thus be obtained when the resin content is too low. The maximum quantity of resin which can be tolerated is limited only by the capacity of the paper to absorb the resin without becoming too thick and inflexible; generally the resin content need not exceed about 25%, and since highly satisfactory results are obtained at resin contents of 2% and lower, the preferred range of resin content is about 0.5 to 2.0%.

The paper products obtained in accordance with this invention are highly valuable and useful in the manufacture of toweling, wrappings, bags, wall-paper, glassine, adhesively bonded laminated articles, and other applications for which high wet-strength paper is commonly employed.

Having now particularly described and ascertained the nature of the said invention and in what manner the same is to be performed, we declare that what we claim is:

1. In a process for the manufacture of paper having high wet-strength properties the step which comprises adding to the cellulosic paper material from 0.5% to about 25%, based on the dry weight of the paper, of a urea-formaldehyde condensation product modified with a member of the class consisting of diglycolic acid and alkali metal salts thereof.

2. In a process for the manufacture of paper having high wet-strength properties the step which comprises adding from 0.5% to 2.0%, based on the dry weight of the paper, of a diglycolic acid-modified urea-formaldehyde condensation product to the cellulosic paper material, the said addition of the diglycolic acid-modified urea-formaldehyde being effected by wetting the cellulosic paper material with an aqueous acidic medium containing the diglycolic acid-modified urea-formaldehyde resin ingredients at a pH of 3.5 to 5.5, the mol ratio of formaldehyde:urea in the said resin ingredients being within the range of 1.5:1 to 2.5:1, and the diglycolic acid content being from 2 to 20 parts per 100 parts of the combined urea and formaldehyde ingredients.

3. In a process for the manufacture of paper having high wet-strength properties the step which comprises adding from 0.5% to 2.0%, based on the dry weight of the paper, of a diglycolic acid-modified urea-formaldehyde condensation product to the cellulosic paper material, the said addition of the diglycolic acid-modified urea-formaldehyde being effected by wetting the cellulosic paper material with an aqueous acidic medium containing the diglycolic acid-modified urea-formaldehyde resin ingredients at a pH of 3.5 to 5.5, the mol ratio of formaldehyde:urea in the said resin ingredients being within the range of 1.5:1 to 2.5:1, and the diglycolic acid content being from 4 to 8 parts per 100 parts of the combined urea and formaldehyde ingredients.

4. In a process for preparing a paper-treating composition which is useful as an impregnating agent for imparting high wet-strength to paper the steps which comprise admixing 2 to 20 parts by weight of diglycolic acid with 100 parts by weight of urea-formaldehyde in an aqueous medium while controlling the pH so that it does not drop below 4, the pH of the urea-formaldehyde composition being initially within the range of 7.0 to 9.0, said urea-formaldehyde composition being a clear stable liquid obtained by liquefying a mixture of gaseous formaldehyde and water vapor having a temperature above 90° C. by cooling to a temperature of 60° to 90° C., the weight of the formaldehyde being from 50% to 70% of the weight of the resultant aqueous liquid mixture, keeping the temperature of the said aqueous liquid continuously at 60° to 90° C. until the said liquid is brought into contact with urea, admixing urea with the said liquid in the presence of a buffer which maintains the pH within the range of 7.0 to 9.0, the amount of the said urea being in the proportion of 1 mol per 4.5 to 7 mols of the said formaldehyde, and maintaining the temperature of the resultant liquid at least momentarily at from 70° to 90° C., whereby the said clear stable urea-formaldehyde liquid composition is obtained, the formaldehyde:urea mol ratio in the said composition being adjusted to from 1.5:1 to 2.5:1 by addition of urea prior to the addition of the diglycolic acid.

5. In a process for preparing a paper-treating composition which is useful as an impregnating agent for imparting high wet-strength to paper the steps which comprise admixing urea with a stable liquid urea-formaldehyde aqueous composition, the relative quantities of urea and the said stable liquid urea-formaldehyde composition being such that the final mol ratio of formaldehyde:urea is within the range of 1.5:1 to 2.5:1, said stable liquid urea-formaldehyde composition being the product obtained by liquefying a mixture of gaseous formaldehyde and water vapor having a temperature above 90° C. by cooling to a temperature of 60° to 90° C., the weight of formaldehyde being from 50% to 70% of the weight of the resultant aqueous liquid mixture, keeping the temperature of the said aqueous liquid continuously at 60° to 90° C., until the said aqueous liquid is brought into contact with urea, admixing urea with the said aqueous liquid in the presence of a buffer which maintains the pH within the range of 7.0 to 9.0, the amount of the said urea being in the proportion of 1 mol per 4.5 to 7 mols of the said formaldehyde, and maintaining the temperature of the resultant liquid at least momentarily at from 70° to 90° C., whereby a product which remains a clear liquid when cooled to 25° C. is obtained, and thereafter adding to the said urea-formaldehyde composition having a formaldehyde:urea ratio of from 1.5 to 2.5 an aqueous solution of diglycolic acid, the quantity of diglycolic acid being from 4 to 8 parts by weight per 100 parts of urea-formaldehyde, the pH of the mixture being controlled so that it does not drop below 4 during the addition of the diglycolic acid to the urea-formaldehyde composition.

6. An alkali metal diglycolate-modified urea-formaldehyde condensation product.

7. A disodium diglycolate-modified urea-formaldehyde condensation product.

8. A clear aqueous dispersion of alkali metal diglycolate - modified urea - formaldehyde condensation product.

9. A clear aqueous dispersion of alkali metal diglycolate - modified urea - formaldehyde condensation product having an alkaline pH.

10. A clear aqueous dispersion of disodium diglycolate-modified urea-formaldehyde condensation product having a viscosity of 250 centipoises, and a pH of 7.45, the quantity of the said condensation product being 69% of the total weight of the dispersion.

11. A process for preparing a clear aqueous dispersion of alkali metal diglycolate-modified urea-formaldehyde condensation product which comprises reacting an unpolymerized urea-formaldehyde condensation product with an alkali metal diglycolate in an aqueous alkaline medium at a temperature within the range of 25° to 100° C.

12. A disodium diglycolate - modified urea-formaldehyde condensation product obtained in accordance with the process of claim 11.

13. The process which comprises impregnating cellulosic paper material with the composition of claim 12.

14. Paper, treated in accordance with claim 13.

JAMES C. LEHR.
DENIS J. O'FLYNN.
READE Y. TOMPSON.

REFERENCES CITED

The following references are of record in the file of this patent:

UNITED STATES PATENTS

| Number | Name | Date |
|---|---|---|
| 2,210,442 | Balle | Aug. 6, 1940 |

Certificate of Correction

Patent No. 2,557,299 June 19, 1951

JAMES C. LEHR ET AL.

It is hereby certified that error appears in the printed specification of the above numbered patent requiring correction as follows:

Column 6, in the table, fifth column, last line thereof, for "48.5" read *38.5*; and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*